United States Patent Office 3,509,180
Patented Apr. 28, 1970

3,509,180
BENZYLBENZYL AND FURFURYLBENZYL ESTERS OF CHRYSANTHEMIC AND PYRETHRIC ACID
Michael Elliott, Harpenden, England, assignor to National Research Development Corporation, London, England, a British corporation
No Drawing. Filed Feb. 2, 1966, Ser. No. 524,499
Claims priority, application Great Britain, Feb. 12, 1965, 6,293/65; Oct. 22, 1965, 44,938/65
Int. Cl. C07c 69/74; C07d 5/16
U.S. Cl. 260—347.4                    13 Claims

ABSTRACT OF THE DISCLOSURE

Esters of formula

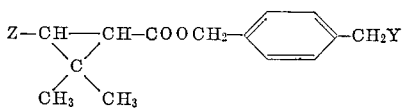

in which Z is the isobutenyl or the 2-carbomethoxy-prop-1-enyl group and Y is a phenyl or a furyl ring, have good insecticidal properties. Methods for the preparation of the novel esters as well as of the intermediate substituted benzyl alcohols, are described. When Y is a phenyl group, it may be substituted by a halogen or lower alkyl, allyl, butenyl, pentadienyl or a hexadienyl group.

---

This invention relates to new insecticidal derivatives of chrysanthemic and related acids, and to processes for their preparation.

The naturally occurring insecticide pyrethrum, obtained from the flower heads of *Chrysanthemum cinerariaefolium* and related species, is now a well established insecticide having a range of desirable biological properties, including a high insecticidal toxicity and rapid knockdown effect, coupled with low mammalian toxicity, and in its combination of favourable properties is superior to many synthetic insecticides which have become available. Unfortunately, however, natural pyrethrum is rather unstable in many formulations in common use and furthermore does not form a sufficiently persistent insecticidal film on all materials and surfaces to which it needs to be applied in practice. It is also expensive and economic factors could make it in short supply.

Much work has been done, therefore, in an attempt to prepare synthetic insecticides having a combination of desirable biological and physical properties such as high toxicity to insects and very low mammalian toxicity, and this investigation has been facilitated by the determination of the structure of the insecticidal esters in natural pyrethrum. A number of esters of the so-called chrysanthemic and pyrethric acids and their derivatives have been prepared, notably allethrin, but even allethrin is inferior in many respects to the natural pyrethrum and it is also difficult and expensive to prepare. At present the use of the pyrethrins and their synthetic relatives is largely restricted to household and industrial application because of their instability and high price.

It is therefore still desirable to have synthetic pyrethroids available having, in addition to high insecticidal activity, rapid knock-down effect and lack of mammalian toxicity, a higher stability and good weather resistance.

The present invention comprises new compounds of the general formula

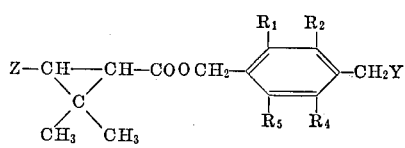

in which Z represents an aryl, alkenyl or carboalkoxyalkenyl group, $R_1$, $R_2$, $R_4$ and $R_5$ which may be the same or different, each represents a hydrogen or halogen atom or an alkyl, alkenyl or alkadienyl group and Y represents a phenyl or furyl ring which may itself be substituted by at least one halogen atom or alkyl, alkenyl or alkadienyl group.

It will be seen that the compounds of the invention may be regarded as derivatives of cyclopropane carboxylic acids of the general formula

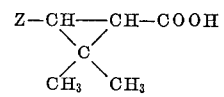

and derivatives of these acids where Z represents an isobutenyl group or a 2-carbomethoxy-prop-enyl group, i.e., derivatives of chrysanthemic acid or pyrethric acid respectively, have been found to be particularly active. Acids of the Formula II can exhibit optical and geometrical isomerism, the various isomers producing compounds of varying insecticidal activity, and it is preferred to use the isomer producing the compound of greatest activity. Thus in the case of chrysanthemic and pyrethric acids it is found that the (+)-trans acids, obtained from natural pyrethrum produce more active compounds than their synthetic counterparts, the (±)-cis-trans isomers, which nevertheless still produce valuable insecticides.

Other useful insecticides of the Formula I may be obtained from 2,2-dimethyl-cyclopropane carboxylic acid substituted in the 3 position by other alkenyl groups or by aryl groups for example a phenyl group.

The esters of this invention are 4-benzylbenzyl-and 4-furfurylbenzyl esters and it has been found that such esters unsubstituted in the ring Y tend to have a higher insecticidal activity than the substituted derivatives. For the same reason it is preferred that the B ring is unsubstituted, i.e. $R_1$, $R_2$, $R_3$ and $R_5$ represent hydrogen atoms. In cases where ring substituents are present it is usually more convenient to prepare compounds in which the substituents are present in the Y, e.g. a phenyl group substituted by at least one methyl group ring. These substituents if present may be one or more selected from halogen atoms, particularly fluorine and chlorine atoms, alkyl groups, particularly lower alkyl groups such as methyl groups, alkenyl groups such as allyl or butenyl groups and alkadienyl groups such as pentadienyl or hexadienyl groups. In compounds where Y represents a furyl ring the furyl ring may be linked to the rest of the molecule through the 2 position.

The compounds of the invention may be prepared by any of the methods customarily used for the preparation of esters and the reactants may be represented generically by the formulae

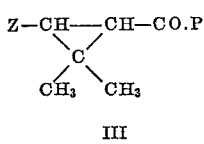

III

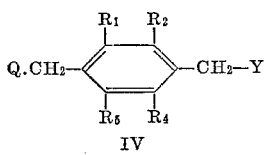

IV where CO.P and Q represent functional groups which react together to give an ester linkage.

Thus esters may be prepared by reacting a substituted benzyl alcohol with the cyclo-propane carboxylic acid or more preferably, with its acid halide, for example by treating the reactants in a solvent in the presence of a hydrogen halide acceptor such as pyridine.

A useful alternative method involves the treatment of a substituted benzylhalide with a silver salt of the cyclopropane carboxylic acid; in this method a rather purer product is obtained and the silver is of course recoverable for further use. This method may be modified to avoid the need for a silver salt by reacting the substituted benzylhalide with a triethylamine salt of the cyclopropane acid. This salt may be prepared in situ by reacting equimolar quantities of the acid and triethylamine.

Benzylbenzyl alcohol and furfurylbenzyl alcohol and their substituted derivatives of the Formula IV (Q=OH) are new compounds. They may be prepared from p-dihalogeno benzenes by Grignard reactions in which the benzyl or furfuryl group is introduced as a first step by reacting a p-halogeno phenyl magnesium halide with a benzyl or furfuryl halide and the resulting product, after conversion into the magnesium derivative, is reacted with formaldehyde to introduce the hydroxymethyl group.

The compounds of the invention may be formulated with an inert carrier or diluent to give insecticidal compositions and they may be prepared for example, in the form of dusts and granular solids, mosquito coils, wettable powders, emulsions, sprays and aerosols after addition of appropriate solvents, diluents and surfactants.

In common with pyrethrum and synthetic pyrethroids the compounds of the invention may be synergised for example, with piperonyl butoxide or with other well known pyrethrin synergists.

The following examples in which temperatures are in ° C. are given to illustrate the invention.

EXAMPLE 1

(a) 4-Benzylbenzylchloride

Diphenylmethane (50 g.), orthophosphoric acid (30 g., 17 ml.) concentrated hydrochloric acid (50 ml.), acetic acid (36 ml.) and trioxan (15 g.) were stirred at 105° for 17 hours. The mixture was then poured into water (800 ml.) and the organic products were extracted into ether (2 x 200 ml.). The ethereal solution was washed in succession with water (500 ml.), saturated potassium hydrogen carbonate (100 ml.), and saturated sodium chloride (50 ml.). After drying ($Na_2SO_4$), the ether was evaporated and distilled at 0.3 mm. to give 4-benzylbenzylchloride (10.5 g.) B.P. 105–124°, $n_D^{20}$ 1.583. Redistillation gave a pure product B.P. 111–112.5°, $n_D^{20}$ 1.5862.

Found: C, 77.65; H, 6.3; Cl, 15.95. $C_{14}H_{13}Cl$ requires C, 77.6; H, 6.05; Cl, 16.4%.

(b) 4-Benzylbenzyl (±)-cis-trans-chrysanthemate 4-benzylbenzylchloride (3.9 g.) was heated with (±)-cis-trans-chrysanthemic acid (3.0 g.) and freshly distilled triethylamine (1.8 g., 2.5 ml.) for 7 hours at 180–190°. The mixture was cooled and shaken with ether (50 ml.) and water (50 ml.) and then the ethereal layer was washed with 10% sulphuric acid (25 ml.), 10% sodium hydroxide (25 ml.) saturated sodium chloride (2 x 25 ml.) and dried ($Na_2SO_4$). After evaporation of ether the residue was distilled at 4×10⁻³ mm. to give 4-benzylbenzyl (±)-cis-trans-chrysanthemate (4.8 g., 77%) B.P. 163–170°, $n_D^{20}$ 1.5526. Found: C, 83.3; H, 8.4. $C_{24}H_{28}O_2$ requires C, 82.7; H, 8.1%.

EXAMPLE 2

(a) 3'-Methyl-4-benzylbenzyl alcohol

A Grignard reagent was prepared in the usual manner from p-dibromobenzene (18 g., 0.5 mol.) and magnesium (13.5 g.) in ether (450 ml.). When reaction was complete dry benzene (300 ml.) was added and ether was removed with fractionation until the temperature in the reaction flask reached 73°. After cooling to room temperature 3-methylbenzyl bromide (46 g.) was added and the mixture was warmed to 60°, when an exothermic reaction started which was moderated by cooling. The mixture was then refluxed for 1 hour and set aside overnight. After removal of magnesium bromide, the filtrate was decomposed with 10% sulphuric acid (150 ml.) by dropwise addition. The benzene layer was then washed with 2 N sodium hydroxide (100 ml.) and with saturated sodium chloride (2 x 100 ml.) dried ($Na_2SO_4$) evaporated and distilled to give 3'-methyl-4-bromodiphenylmethane (39.1 g.) B.P. 110–113°/0.1 mm., $n_D^{20}$ 1.5963. Found: C, 64.55; H, 5.4; Br, 30.4. $C_{14}H_{13}Br$ requires C, 64.4; H, 5.0; Br, 30.7%.

A Grignard reagent was prepared from 3'-methyl-4-bromodiphenylmethane (32.6 g.) in tetrahydrofuran with magnesium (3.4 g.) and then treated with formaldehyde vapour generated by heating paraformaldehyde (5.5 g.). At the end of treatment with formaldehyde the colour of the solution changed from yellow to green and refluxing ceased. The reaction product was decomposed with saturated ammonium chloride (30 ml.) and after decanting from the solid, this was washed with ether (200 ml.). The combined organic layers were washed with saturated sodium chloride, with 10% sodium hydroxide and with sodium chloride again. After drying ($Na_2SO_4$) and evaporation, the residue was distilled at 0.1 mm. to give 3-methyl-4-benzylbenzyl alcohol B.P. 144° which crystallised on standing and was recrystallised from benzene hexane to give the required alcohol 10.1 g., M.P. 54.5°. A sample recrystallised for analysis had M.P. 55.5°. Found: C, 84.4; H, 7.4. $C_{15}H_{16}O$ requires C, 84.9; H, 7.6%.

(b) 3'-Methyl-4-benzylbenzyl (±)-cis-trans-chrysanthemate

3'-methyl-4-benzylbenzyl alcohol (2.92 g.) was set aside for 12 hours at room temperature with (±)-cis-trans-chrysanthemoyl chloride (2.33 g.) in benzene (13 ml.), ether (25 ml.) and pyridine (1.0 ml.). The product was then washed with dilute sulphuric acid, potassium hydrogen carbonate solution and saturated sodium chloride solution and was dried ($Na_2SO_4$) evaporated and distilled to give 3'-methyl-4-benzylbenzyl (±)-cis-trans-chrysanthemate (3.8 g.) B.P. 182–186°/4.1×10⁻² mm., $n_D^{20}$ 1.5470. Found: C, 82.3; H, 8.4%. $C_{25}H_{30}O_2$ requires C, 82.8; H, 8.4%.

The following alcohols were prepared by the Grignard route described in paragraph (a) above using the appropriately substituted benzyl chloride in place of 3-methylbenzyl chloride. The alcohols were then esterified by the method described in paragraph (b) above to give the following esters:

PHYSICAL PROPERTIES

| Alcohol | Benzyl alcohols | | M.P. (deg.) | (±)-Cis-trans-chrysanthemates | |
|---|---|---|---|---|---|
| | B.P. | $n_D^{20}$ | | B.P. | $n_D^{20}$ |
| 4'-fluoro-4-benzylbenzyl alcohol | 135–145°/0.1 mm | 1.5738 | 62 | 181°/2×10⁻² mm | 1.5415 |
| 4'-chloro-4-benzylbenzyl alcohol | 158–160°/0.05 mm | | 78 | 184°/2.5×10⁻² mm | 1.5557 |
| 3',4'-dimethyl-4-benzylbenzyl alcohol. | 151–159°/0.05 mm | | 66 | 190°/7×10⁻³ mm | 1.5485 |
| 2'-methyl-4-benzylbenzyl alcohol | 138°/0.1 mm | 1.5915 | 53 | 174°/2.5×10⁻² mm | 1.551 |
| 4'-methyl-4-benzylbenzyl alcohol | 156°/0.1 mm | | 65 | 190°/4×10⁻² mm | ¹1.5480 |
| 2',4',6'-trimethyl-4-benzylbenzyl alcohol.² | 164–168°/0.7 mm | | 104–7 | 199°/1.8×10⁻² mm | 1.5500 |

¹ M.P. 45–51°.
² Made from mesitylene and 4-bromobenzylbromide, not Grignard reaction.

EXAMPLE 3

4-(2-furfuryl)-benzyl (±)-cis-trans-chrysanthemate (a) 2-furfuryl chloride.—Thionyl chloride (61.7 g., 0.52 mol., purified by distillation from quinoline, then from linseed oil) in ether (50 ml.) is added dropwise to 2-furfuryl alcohol (46.2 g., 0.47 mol.) and pyridine (0.57 mol.) in ether (50 ml.) during 90 minutes, whilst the temperature is maintained below 9°. After stirring the mixture for another 25 minutes, the ether layer is decanted and the residue washed with four successive portions of ether. The combined ether extracts are shaken with 50% potassium hydroxide (50 ml., in small portions) whilst still cooling the mixture to 0°. The ether layer is then separated and dried over sodium carbonate at 0°. Evaporation of the ether and distillation of the residue gives 2-furfuryl chloride (20 g.) B.P. 52–52.8°/26 mm., $n_D^{20}$ 1.4930.

(b) 4-(2-Furfuryl)bromobenzene.—2-furfuryl chloride (55 g., 0.47 mol.) in ether (250 ml.) is added dropwise to 4-bromophenyl magnesium bromide [from p-dibromo benzene (114 g., 0.47 mol.) and magnesium (12.6 g., 0.52 mol.)] at such a rate that gentle refluxing is maintained. The colour of the solution changes from brown to green and a solid precipitates. After setting aside overnight, water and then dilute sulphuric acid is added and the ether layer separated. The aqueous layer is extracted with ether and the combined ether layers washed with 10% sodium hydroxide, twice with saturated sodium chloride and finally dried over sodium sulphate. Evaporation of the ether and distillation of the residue gives 4-(2-furfuryl) bromobenzene (37 g.) B.P. 96°/4×10⁻² mm., $n_D^{20}$ 1.5780.

(c) 4-(2-Furfuryl) benzyl alcohol.—Formaldehyde vapour [by evaporation from paraformaldehyde (4.7 g.)] is passed into 4-(2-furfuryl)-phenyl magnesium bromide [from 4-(2-furfuryl) bromobenzene (37 g., 0.16 mol.) and magnesium (4.2 g., 0.17 mol.) in redistilled tetrahydrofuran (60 ml.)]. When addition is complete the solution is refluxed for 20 minutes and after cooling, saturated ammonium chloride solution added and the organic material taken up in ether. The ether layer is washed with 10% sodium hydroxide, with saturated sodium chloride solution, and dried over sodium sulphate. Evaporation and distillation gives, after rejection of lower boiling material, 4-(2-furfuryl) benzyl alcohol, 7.59 g., B.P. 104–122°/1.5×10⁻² mm., $n_D^{20}$ 1.5660. Found: C, 77.1; H, 6.8%. $C_{12}H_{12}O_2$ requires C, 76.57; H, 6.43%.

(d) 4-(2-furfuryl)benzyl (±)-cir-trans-chrysanthemate.—(±)-Cis-trans-chrysanthemoyl chloride (2.3 g.) in benzene (14 ml.) is added with stirring to a cooled solution of 4-(2-furfuryl)benzyl alcohol (2.5 g.) in ether (25 ml.) containing pyridine (0.98 ml.). After setting aside overnight, water is added and the organic layer washed with dilute sulphuric acid, with saturated potassium hydrogen carbonate solution and twice with saturated sodium chloride solution. After drying over sodium sulphate and evaporation of solvents, the residue is distilled to give 4-(2-furfuryl)benzyl (±)-cis-trans-chrysanthemate (3.4 g.) B.P. 158–168°/3×10⁻³ mm., $n_D^{20}$ 1.5325. Found: C, 78.1; H, 7.8. $C_{21}H_{24}O_3$ requires C, 77.8; H, 7.5%.

The insecticidal properties of these esters have been investigated with respect to houseflies, (*Musca domestica* L.) and mustard beetles (*Phaedon cochleariae* Fab.) and it has been found that the insecticidal activity of the benzylbenzyl esters is more pronounced with respect to mustard beetles than with respect to houseflies. The toxicity of 4-benzylbenzyl (±)-cis-trans-chrysanthemate and 4'-fluoro-benzylbenzyl (±)-cis-trans-chrysanthemate with respect to mustard beetles is of the same order as the toxicity of allethrin. 4-(2-furfuryl)-benzyl (±)-cis-trans-chrysanthemate is an excellent insecticide for houseflies, being a little more toxic than allethrin or the pyrethrins. It has a rather greater paralytic (knock-down) effect than many substituted benzyl esters of chrysanthemic acid and is somewhat better synergised by piperonyl butoxide than other substituted benzyl esters.

I claim:

1. A compound of formula

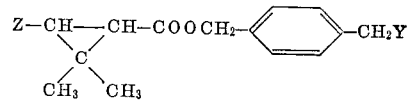

in which Z is the isobutenyl or the 2-carbomethoxy-prop-1-enyl group and Y is an unsubstituted phenyl or furyl ring or phenyl substituted by halogen or lower alkyl, allyl, butenyl, pentadienyl or hexadienyl.

2. A compound according to claim 1 in which the group Y represents the unsubstituted phenyl or 2-furyl ring.

3. A compound according to claim 1 in which Z represents the iso-butenyl group.

4. A compound according to claim 1 which is 4-benzylbenzyl(±)-cis-trans-chrysanthemate.

5. A compound according to claim 1 which is 4'-fluoro-4-benzylbenzyl (±)-cis-trans-chrysanthemate.

6. A compound according to claim 1 which is 4'-(2-furfuryl)-benzyl (±)-cis-trans-chrysanthemate.

7. A compound according to claim 1 which is 3'-methyl-4-benzylbenzyl (±)-cis-trans-chrysanthemate.

8. A compound according to claim 1 which is 4'-chloro-4-benzylbenzyl (±)-cis-trans-chrysanthemate.

9. A compound according to claim 1 which is 3', 4'-dimethyl-4-benzylbenzyl (±)-cis-trans-chrysanthemate.

10. A compound according to claim 1 which is 2'-methyl-4-benzylbenzyl (±)-cis-trans-chrysanthemate.

11. A compound according to claim 1 which is 4'-methyl-4-benzylbenzyl (±)-cis-trans-chrysanthemate.

12. A compound according to claim 1 which is 2',4',6'-trimethyl-4-benzylbenzyl (±)-cis-trans-chrysanthemate.

13. A benzyl alcohol of formula

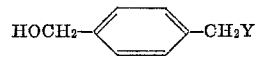

in which Y is an unsubstituted phenyl or furyl ring or phenyl substituted by halogen or lower alkyl, allyl, butenyl, pentadienyl or hexadienyl.

References Cited

Chemical Abstracts—Selim, vol. 51(1957), p. 2667.

ALEX MAZEL, Primary Examiner

B. I. DENTZ, Assistant Examiner

U.S. Cl. X.R.

260—347.8, 468